(12) United States Patent
Liu et al.

(10) Patent No.: US 9,470,157 B2
(45) Date of Patent: Oct. 18, 2016

(54) HILL START ASSIST METHOD AND A CONTROLLER FOR HILL START ASSIST OF A VEHICLE

(71) Applicant: Autoliv Development AB, Vargarda (SE)

(72) Inventors: Wei Liu, Shanghai (CN); Long Ying, Novi, MI (US)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/437,634

(22) PCT Filed: Nov. 11, 2013

(86) PCT No.: PCT/CN2013/086865
§ 371 (c)(1),
(2) Date: Apr. 22, 2015

(87) PCT Pub. No.: WO2014/071883
PCT Pub. Date: May 15, 2014

(65) Prior Publication Data
US 2015/0292419 A1    Oct. 15, 2015

(30) Foreign Application Priority Data
Nov. 12, 2012 (CN) .......................... 2012 1 0451094

(51) Int. Cl.
*F02D 29/02* (2006.01)
*B60W 30/18* (2012.01)
(Continued)

(52) U.S. Cl.
CPC ........ *F02D 29/02* (2013.01); *B60W 30/18118* (2013.01); *F02D 41/10* (2013.01);
(Continued)

(58) Field of Classification Search
CPC ............... B60W 10/02; B60W 10/06; B60W 30/18118; B60W 30/18027; B60W 10/18; B60W 2550/142; B60W 2510/0638; B60W 2520/10; B60W 2540/10; B60W 2520/14; B60W 2540/16; B60W 10/115; B60T 7/042; B60T 7/12

USPC .......... 701/48, 36, 99, 165, 84; 477/203, 92
See application file for complete search history.

(56) References Cited

U.S. PATENT DOCUMENTS 6,135,920 A * 10/2000 Kamiya ............... B60W 10/06
                                                         477/185
6,404,072 B2 * 6/2002 Onoyama ............. B60K 6/485
                                                         290/40 A
(Continued)

FOREIGN PATENT DOCUMENTS

| CN | 1852822 A | 10/2006 |
|----|-----------|---------|
| CN | 101687511 A | 3/2010 |
| CN | 101982358 A | 3/2011 |
| CN | 102019924 A | 4/2011 |
| FR | 2858032 A1 | 1/2005 |
| WO | 2009043740 A1 | 4/2009 |

OTHER PUBLICATIONS

International Search Report for PCT/CN2013/086865, ISA/CN, mailed Feb. 27, 2014.

*Primary Examiner* — Marthe Marc-Coleman
(74) *Attorney, Agent, or Firm* — Stephen T. Olson; Harness, Dickey & Pierce, P.L.C.

(57) ABSTRACT

A hill start assist method for a vehicle includes a vehicle-mounted controller for sensing an intention to start on an uphill slope, and converts a sensed gradient resistance into a target torque, and enables the engine to have adequate torque reserve in advance; therefore, in the subsequent start, driving wheels can obtain sufficient driving force to ensure that the vehicle will not slide backward. Furthermore, for a manual automobile, the engine torque is boosted in an early stage during a clutch release by a driver, thus accelerating the rotation speed of the engine, and avoiding, to a certain extent, engine stalling caused by a too quick or too much clutch release, compared with the situation where the engine is completely idling.

16 Claims, 2 Drawing Sheets

(51) Int. Cl.
*F02D 41/10* (2006.01)
*B60W 10/06* (2006.01)
*F02D 11/10* (2006.01)

(52) U.S. Cl.
CPC ......... *B60W 10/06* (2013.01); *B60W 2540/10* (2013.01); *B60W 2540/14* (2013.01); *B60W 2550/142* (2013.01); *B60W 2710/0644* (2013.01); *B60W 2710/0666* (2013.01); *F02D 11/105* (2013.01); *F02D 2200/702* (2013.01); *F02D 2250/18* (2013.01)

(56) References Cited

U.S. PATENT DOCUMENTS

| | | | |
|---|---|---|---|
| 6,896,340 B2 | 5/2005 | Kinser et al. | |
| 7,226,389 B2 * | 6/2007 | Steen | B60T 7/122 477/195 |
| 2008/0051968 A1 * | 2/2008 | Belen | B60T 7/12 701/74 |
| 2010/0204890 A1 | 8/2010 | Desfriches et al. | |
| 2010/0262349 A1 | 10/2010 | Braeuer | |
| 2011/0065548 A1 | 3/2011 | Yu et al. | |

* cited by examiner

HILL START ASSIST METHOD AND A CONTROLLER FOR HILL START ASSIST OF A VEHICLE

CROSS REFERENCE TO RELATED APPLICATIONS

This application is a 371 U.S. National Stage of International Application No. PCT/CN2013/086865, filed Nov. 11, 2013. This application claims the benefit of Chinese Patent Application No. 201210451094.5, filed Nov. 12, 2012. The disclosures of the above applications are incorporated herein by reference.

TECHNICAL FIELD

The present invention relates to a hill start assist method and a controller for hill start assist of a vehicle.

BACKGROUND INFORMATION

Currently, for a manual vehicle, the starting process on a hill generally comprises the following four steps: (1) pressing down a brake pedal by a driver to generate a brake force, so as to assure that the vehicle is stationary on the slope; (2) then slowly releasing a clutch pedal to vibrate the vehicle body, so that the clutch enters into a partial linkage state, and thus a certain driving power is transmitted to driving wheels; (3) releasing the brake pedal and turning to press down the gas pedal, at this time the initial brake force for assuring the vehicle stationary disappears; (4) at the same time or a little later, releasing the clutch pedal by the driver, so that the clutch is or will be in a complete linkage state. Thus, enough driving power is transmitted to the driving wheels of the vehicle. The hill start of the vehicle is completed.

During the hill starting process of the manual vehicle, it is the most difficult for the driver to control the degree of step (2) among all of the four steps. In step (2), if the driver releases the clutch pedal too quickly, the clutch will enter into the complete linkage state quickly, so that the motor of the vehicle is easy to flameout. However, in step (2), if the driver releases the clutch pedal too shallowly, then sufficient driving power cannot be transmitted to the driving wheels. If so, under the circumstance that the brake force disappears in subsequent step (3), the vehicle easily rolls back along the slope, and thus may cause a danger on the road.

In order to solve this problem, the prior art provides a vehicle with a hill start assist function. However, this function must be achieved by the Electronic Stability Control (ESC). In particular, this function may be achieved by the following process: in Step (1), ESC detects the degree of the slope by an axial acceleration sensor; if the driver releases the clutch pedal too slowly, then in step (3) when the driver starts to release the brake pedal, the ESC closes the internal electromagnetic valve, the brake force remains in the braking line, and since the brake force still remains, the vehicle continues to be stationary on the slope, and would not roll back; then in step (4), the ESC communicates with the engine management system, and once the ESC detects that the drive power is enough to overcome the hill gravity during the time that the accelerator pedal is pressed down, the brake force in the braking line is released immediately. At this time, the vehicle will overcome the hill gravity owing to the driving power, though the brake force has disappeared, and thus the vehicle starts to move. As the driver continues to press down on the gas pedal, the driving power will increase gradually, so that the vehicle will run forwardly, and meanwhile the above hill start assist function will quit.

In the prior art, the above hill start assist method achieved by ESC is commonly used. This disadvantage is that the vehicle has to incorporate the ESC product. However, ESC has a low assembly percentage in the current market. For example, only 15% of cars include an ESC in the market of China. Moreover, most of the vehicles assembled with an ESC function are high-class, automatic transmission equipped cars. The percentage of vehicles having an ESC with a hill start assist function is much lower for manual transmission equipped vehicles. In addition, an ESC product is expensive, for example, the sales price is RMB 800-1000 in China.

It is also noted that, in order to maintain brake force in the braking line when the driver releases the braking pedal, the above conventional hill start assist system needs to be assembled with a particular valve: a so-called "isolation valve". However, this type of isolation valve is usually mounted within ESC products, but is not provided within an anti-lock braking system (ABS), which is widely assembled on the vehicle.

SUMMARY

The present invention provides a hill start assist method and a controller for hill start assist, to solve the problems in the prior art where the vehicle roll backs easily or the engine shuts down during vehicle starting movement.

In particular, the present invention provides a hill start assist method for a vehicle, the method comprises:

Step (1): sensing the degree of the slope resistance when the vehicle is stationary on the slope;

Step (2): detecting hill start intention based on the change of the parameters or statuses related to the vehicle occurring when the vehicle starts moving on a hill; and Step (3): after the hill start intention has been detected, converting the sensed slope resistance into the target torque of the engine, and controlling the engine to increase the engine torque to the target torque.

Particularly under the circumstance that the vehicle is a manual vehicle, in the step (2), the hill start intention is determined based on the change of the engine speed while the clutch pedal is being released.

The change of the engine speed is determined when the engine gradually transfers from a complete idle state to an idle loaded state.

Alternatively under the circumstance that the vehicle is an automatic vehicle, in the step (2), if a brake pedal switch signal detects that the brake pedal is completely released, the hill start intention is detected.

Particularly in the step (1), the slope resistance is calculated by the following formula:

$$Fx = m*i,$$

wherein Fx—slope resistance, unit: Newton (N);
m—vehicle weight, unit: kilogram (kg);
i—the slope degree, unit: meter per square second (m/s²).

Particularly in the step (3), the target torque of the engine is calculated by the following formula:

$$T_{target} = Fx*r/i_0/i_1;$$

wherein $T_{target}$—the target torque of the engine;
Fx—slope resistance, unit: Newton (N);
r—the radius of the wheels, unit: meter (m);
$i_0$—main reducer ratio, unit: N/A; and
$i_1$—first-gear transmission ratio, unit: N/A.

In particular, the present invention provides a controller for hill start assist of a vehicle, the controller comprises:

first device for sensing the degree of the slope resistance when the vehicle is stationary on the slope;

second device for detecting hill start intention based on the change of the parameters or statuses related to the vehicle occurred during the vehicle starting on the hill; and third device for converting the sensed slope resistance into the target torque of the engine after the hill start intention has been detected, and controlling the engine to increase the engine torque to the target torque.

Particularly the vehicle is a manual vehicle, and the second device detects the hill start intention based on the change of the engine speed while the clutch pedal is being released.

The change of the engine speed is determined when it is detected that the engine gradually transfers from a complete idle state to an idle loaded state.

Particularly under the circumstance that the vehicle is an automatic vehicle, the second device detects the hill start intention when a brake pedal switch signal detects that the brake pedal is completely released.

The first device calculates the slope resistance by the following formula:

$$Fx=m*i,$$

wherein Fx—slope resistance, unit: Newton (N);
m—vehicle weight, unit: kilogram (kg);
i—the slope degree, unit: meter per sq. second (m/s$^2$).

The third device calculates the target torque of the engine by the following formula $$T_{target}=Fx*r/i_0/i_1,$$

wherein $T_{target}$—the target torque of the engine;
Fx—slope resistance, unit: Newton (N);
r—the radius of the wheels, unit: meter (m);
$i_0$—main reducer ratio, unit: N/A;
$i_1$—first-gear transmission ratio, unit: N/A.

The controller is selected from the group comprising: engine controller, airbag controller, ABS controller and ESC controller.

The first device is a longitudinal acceleration sensor which is separated from the controller, or integrated within the controller.

In the hill starting assistance of the present invention, the engine has reserved enough torque in advance by the controller, and thus in the subsequent vehicle starting, the driving wheels can obtain enough driving power to assure that the vehicle will not roll back. The hill start assist method of the present invention does not rely on the ESC product, and the HAS (hill start assist) function can be achieved within several types of vehicles, including manual transmission equipped vehicles and automatic transmission equipped vehicles. In addition, with a manual transmission equipped vehicle, the driver increases the engine torque in the earlier stage of the process of releasing the clutch to increase the engine speed, therefore, compared with the condition that the engine is in a complete idle state, to some extent it can be avoided to suppress the engine from stalling as the clutch is released too fast or too deeply. By means of the above method, the vehicle is easily operated during the hill starting process, and the method is very practical.

DRAWINGS

DETAILED DESCRIPTION

Hereinafter, the same reference refers to the same element. The hill start assist method of the present invention may be integrally controlled by a controller with a CAN communication function in a vehicle. The controller may be selected from the group comprising: motor controller, airbag controller, ABS controller or ESC controller.

The hill start assist method does not rely on the ESC product, and thus the HAS function can be achieved within several types of vehicles, including manual vehicles and automatic vehicles.

Figure 1:
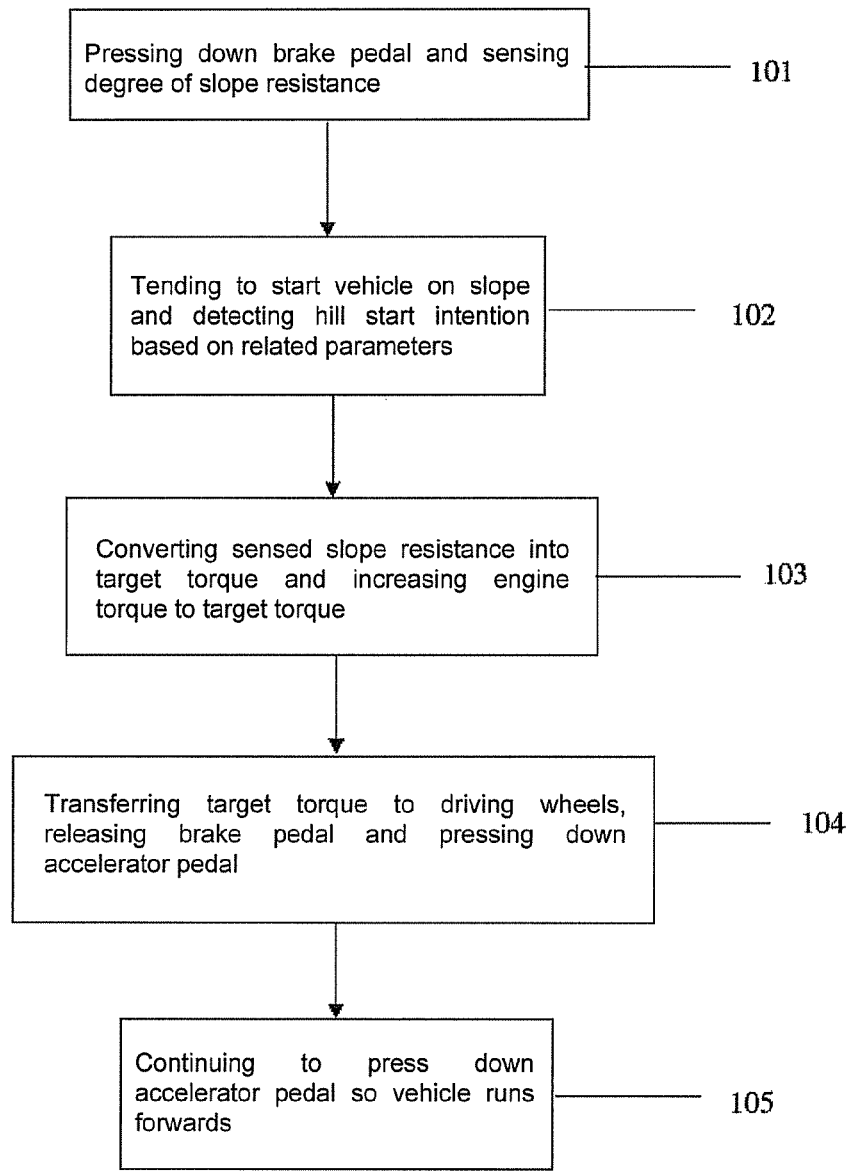
FIG. 1 shows a flow-chart for representing a vehicle hill starting process achieved by the hill start assist method of the present invention.

FIG. 1 shows a flow-chart for representing a vehicle hill starting process achieved by the hill start assist method of the present invention.

As shown in FIG. 1, in Step 101, initially, the vehicle is stationary on the slope. At this time, the hill gravity can be detected by an axial acceleration sensor.

Said axial acceleration sensor may be separated from the controller, or integrated within the controller, e.g. integrated within a circuit board in the controller.

The above hill gravity may be calculated by the following formula:

$$Fx=m*i;$$

Fx—slope resistance, unit: Newton (N)
m—vehicle weight, unit: kilogram (kg); and
i—the slope degree, unit: meter per square second (m/s$^2$).

In Step 101, the driver presses down the brake pedal, so as to assure that the vehicle is stationary on the slope. In addition, in this step, if the vehicle has a manual transmission, the driver also needs to press down the clutch pedal, to be ready for the subsequent starting of the vehicle.

Then, in Step 102, when the driver tends to start the vehicle on the slope, the driver's purpose of vehicle starting on the slope is detected based on the change of the related parameters or statuses occurring as the vehicle is starting to move.

For example, for a manual transmission equipped vehicle, the driver's starting intention may be detected by the change of the engine speed. In particular, when the driver tends to start the vehicle on the slope, the driver starts to slowly release the clutch pedal, so that the clutch enters into the partial linkage state. In this time, the engine is gradually connected with the vehicle's transmission system, and thus the motor gradually transfers from a complete idle state (e.g. idling engine speed is about 800-900 R/min) to an idle loaded state (e.g. at this time the engine speed of the motor is about 500-600 R/min). The driver's intention for starting the vehicle on the slope is detected based on the change in the engine speed. It should be noted that the engine speed can be detected by a motor rotary sensor configured within the engine management system, and the detected change of the engine rotational speed can be transmitted to the controller through the CAN communication.

For an automatic vehicle, the driver's starting intention may be detected by the releasing of the brake pedal. In particular, when the driver tends to start the vehicle on the slope, the driver releases the brake pedal. The releasing of the brake pedal may be detected by a brake pedal switch, and the signal representing the change of the brake pedal switch means that the driver is ready to start the vehicle. The signal may also be transmitted to the controller through the CAN communication.

After the driver's hill starting intention has been detected, in Step 103, the controller converts the sensed slope resistance into the target torque of the engine in accordance with the following formula:

$$T_{target} = Fx * r / i_0 / i_1;$$

$T_{target}$—the target torque of the engine;
Fx—slope resistance, unit: Newton (N);
r—the radius of the wheels, unit: meter (m);
$i_0$—main reducer ratio, unit: N/A; and
$i_1$—first-gear transmission ratio, unit: N/A.

Then, the controller sends a torque-increasing request to the engine by software controlling or communication controlling (e.g. CAN communication associated with the engine) to increase the engine torque to a target torque, e.g. to the target torque $T_{target}$, so that the engine has reserved enough torque. As the clutch is in a lighter partial linkage state, the engine only outputs lower torque, and most of the torque reserve is used to accelerate the engine itself. Therefore, the speed of the engine increases (e.g. the engine speed is about 1200-2000 R/min).

Then, in Step 104, because the engine's torque has been increased to the target torque, the target torque used as the torque reserve is transferred to the driving wheels through the vehicle transmission system, so that the driving wheels obtain enough driving power to overcome the slope resistance. Therefore, when the driver starts to release the brake pedal and turns to press down the accelerator pedal, the vehicle cannot roll back.

In particular, in a manual transmission equipped vehicle, the driver continues to release the clutch pedal, the clutch gradually enters the heavier half linkage state. When the engine speed is decreased to the normal idling speed, it means that the torque reserve of the engine has been mostly used for the loads, i.e., transferred to the driving wheels.

Alternatively, in automatic vehicles, the driver continues to release the brake pedal until it is released completely. As above, the driving wheels obtain enough drive power due to the torque reserve. Therefore, in the duration from "releasing brake pedal" to "pressing down accelerator pedal", the vehicle cannot roll back.

Finally, in Step 105, the driver presses down the accelerator pedal, so that the vehicle obtains more driving power. Therefore, the vehicle will run forwards, and at this time the hill start assist function quits.

In addition, with a manual transmission equipped vehicle, the present application also has a function for avoiding engine stalling. Under this condition, the driver increases the engine's torque in the earlier stage of the process for releasing the clutch, to increase the engine speed. Therefore, compared with the condition that the engine is in a complete idle state, engine stalling can be avoided to some extent if the clutch is released too fast or too deeply.

As above, the controller for controlling the hill start assist method may be selected from the group comprising: engine controller, airbag controller, ABS controller and ESC controller.

Figure 2:
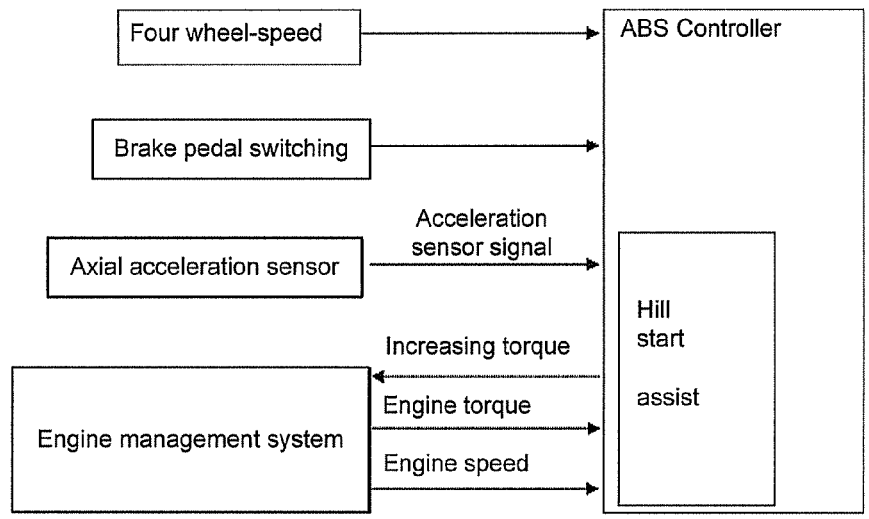
FIG. 2 shows a block diagram for representing the hill start assist method of the present invention under the control of an ABS controller.

Taking ABS controller as an example, as shown in FIG. 2, the ABS controller obtains the engine speed and the engine torque from the engine management system through the CAN communication, and detects the hill gravity by the axial acceleration sensor. The driver's hill starting intention can be detected by the change of the engine speed. Then, the ABS controller converts the sensed hill gravity into the target torque of the engine. Then, the ABS controller sends the instruction for torque reserve to the engine management system through the CAN communication. Then, the driver starts to press down the accelerator pedal, and in this duration the driving wheels obtain enough driving power, due to the torque reserve, so that the vehicle cannot roll back. The driver continues to press down the accelerator pedal, and the vehicle will start to run forwards.

Figure 3:
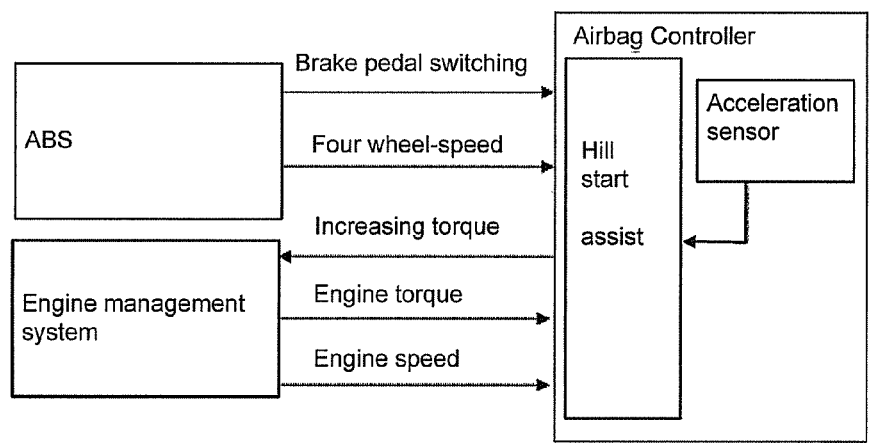
FIG. 3 shows a block diagram for representing the hill start assist method of the present invention under the control of an airbag controller.

In addition, taking an airbag controller as an example, as shown in FIG. 3, the airbag controller obtains the engine speed and the engine torque from the engine management system through the CAN communication, obtains four wheel-speed signals and the brake pedal switching signal from the airbag controller itself, and obtains the hill gravity from the axial acceleration sensor built within the airbag controller itself, and then by certain judgment, sends the instruction for the torque reserve to the engine through the CAN communication. The driver's hill starting intention can be detected by the change of the engine speed. Then, the airbag controller converts the sensed slope resistance into the target torque of the engine. Then, the airbag controller sends the instruction for torque reserve to the engine through the CAN communication. Then, the driver starts to press down the accelerator pedal, and in this duration the driving wheels obtain enough driving power due to the torque reserve so that the vehicle cannot roll back. The driver continues to press down the gas pedal, and the vehicle will start to run forwards.

It is easy for the skilled in the art to understand that, the protection scope of the present invention is not limited within the above embodiments. Any equivalent modifications for the present invention fall into the protection scope of the present invention.

The invention claimed is:

1. A hill start assist method for a vehicle, the method comprising:
    using an acceleration sensor to sense a degree of a slope resistance when the vehicle is stationary on a slope;
    detecting a hill start intention based on a change of parameters or statuses related to the vehicle occurred during starting of the vehicle on a hill, the change of parameters or statuses including detecting at least one of:
        a release of a brake pedal of the vehicle; or
        a drop in engine speed; and
    after the hill start intention has been detected, using an electronic controller to convert a sensed slope resistance into a target torque of the engine, and controlling the engine to increase an engine torque to the target torque to counteract a momentary rearward rolling of the vehicle without further engaging a brake of the vehicle.

2. The hill start assist method according to claim 1, wherein the vehicle is a manual transmission equipped vehicle, and the hill start intention is determined based on a change of the engine speed during release of a clutch pedal of the vehicle.

3. The hill start assist method according to claim 2, wherein the change of the engine speed is determined when the engine speed gradually changes from an unloaded idle speed to a loaded idle speed.

4. The hill start assist method according to claim 1, wherein the vehicle is an automatic transmission equipped vehicle, and detecting a hill start intention includes detecting from a brake pedal switch signal that a brake pedal of the vehicle is completely released.

5. The hill start assist method according to claim 4, wherein the change of the engine speed is determined when the engine gradually transfers from an unloaded idle speed to a loaded idle speed during release of the brake pedal.

6. The hill start assist method according to claim 1, wherein the slope resistance is calculated by the following formula:

$$Fx=m*i;$$

wherein Fx—slope resistance, unit: Newton (N);
m—vehicle weight, unit: kilogram (kg); and
i—the slope degree, unit: meter per square second (m/s2).

7. The hill start assist method according to claim 6, wherein the target torque of the engine is calculated by the following formula:

$$Ttarget=Fx*r/i0/i1;$$

wherein Ttarget—the target torque of the engine;
Fx—slope resistance, unit: Newton (N);
r—the radius of the wheels, unit: meter (m);
i0—main reducer ratio; and
i1—first-gear transmission ratio.

8. A controller for a hill start assist of a vehicle, the controller comprising:
a first device for sensing a degree of a slope resistance when the vehicle is stationary on a slope;
a second device for detecting a hill start intention based on a change of parameters or statuses related to the vehicle occurring during starting movement of the vehicle on a hill, the change of parameters or statuses including at least one of:
a release of a brake pedal of the vehicle; or
a drop in engine speed of an engine of the vehicle; and
a third device for converting a sensed slope resistance into a target torque for the engine after the hill start intention has been detected, and controlling the engine to increase an engine torque to the target torque to counteract a momentary rearward rolling of the vehicle without further engaging a brake of the vehicle.

9. The controller for a hill start assist of a vehicle according to claim 8, wherein the vehicle is a manual transmission equipped vehicle having a clutch pedal, and the second device detects the hill start intention based on a change of the engine speed during release of the clutch pedal of the vehicle.

10. The controller for a hill start assist of a vehicle according to claim 9, wherein the change of the engine speed is determined when it is detected that the engine gradually transfers from an unloaded idle speed to a loaded idle speed.

11. The controller for a hill start assist of a vehicle according to claim 8, wherein when the vehicle is an automatic transmission equipped vehicle, the second device detects the hill start intention when a brake pedal switch signal is detected from a brake pedal switch indicating that the brake pedal is completely released.

12. The controller for a hill start assist of a vehicle according to claim 11, wherein the change of the engine speed of the engine is determined when it is detected that the engine gradually transfers from an unloaded idle speed to an idle loaded speed during release of the brake pedal.

13. The controller for a hill start assist of a vehicle according to claim 8, wherein the first device calculates the slope resistance by the following formula:

$$Fx=m*i;$$

wherein Fx—slope resistance, unit: Newton (N);
m—vehicle weight, unit: kilogram (kg); and
i—the slope degree, unit: meter per square second (m/s2).

14. The controller for a hill start assist of a vehicle according to claim 13, wherein the third device calculates the target torque of the engine by the following formula:

$$Ttarget=Fx*r/i0/i1;$$

wherein Ttarget—the target torque of the engine;
Fx—slope resistance, unit: Newton (N);
r—the radius of the wheels, unit: meter (m);
i0—main reducer ratio; and
i1—first-gear transmission ratio.

15. The controller for a hill start assist of a vehicle according to claim 8, wherein said controller is selected from the group consisting of:
an engine controller, an airbag controller, an Anti-lock Brake System (ABS) controller and an Electronic Stability Control (ESC) controller.

16. The controller for a hill start assist of a vehicle according to claim 8, wherein the first device is a longitudinal acceleration sensor which is at least one of separated from the controller or integrated within the controller.

\* \* \* \* \*